(12) United States Patent
Dodor et al.

(10) Patent No.: US 10,147,118 B2
(45) Date of Patent: Dec. 4, 2018

(54) DETECTION OF MOBILE DEVICE PAIRING PATTERNS USING TRANSACTIONAL PROXIMITY

(71) Applicant: International Business Machines Corporation, Armonk, NY (US)

(72) Inventors: Dmitri S. Dodor, Pepperell, MA (US); Jeffrey R. Pratt, Groton, MA (US); Kyle D. Robeson, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 550 days.

(21) Appl. No.: 14/712,129

(22) Filed: May 14, 2015

(65) Prior Publication Data

US 2016/0335666 A1 Nov. 17, 2016

(51) Int. Cl.
*G06Q 30/00* (2012.01)
*G06Q 30/02* (2012.01)
*H04W 4/021* (2018.01)
*H04W 4/029* (2018.01)

(52) U.S. Cl.
CPC ..... *G06Q 30/0255* (2013.01); *G06Q 30/0267* (2013.01); *H04W 4/021* (2013.01); *H04W 4/029* (2018.02)

(58) Field of Classification Search
None
See application file for complete search history.

(56) References Cited

U.S. PATENT DOCUMENTS

| 8,725,567 B2 | 5/2014 | Huang et al. |
| 8,825,526 B2 | 9/2014 | Peters et al. |
| 2005/0147072 A1 | 7/2005 | Mahendran et al. |

(Continued)

FOREIGN PATENT DOCUMENTS

JP 2013178256 A * 9/2013 ........... G01S 5/0027

OTHER PUBLICATIONS

Witteman. Efficient Proximity Detection Among Mobile Clients Using the GSM Network. (Oct. 18, 2007). Retrieved online Jul. 11, 2018. https://www.utwente.nl/en/eemcs/dacs/assignments/completed/master/reports/2007-witteman.pdf (Year: 2007).*

(Continued)

*Primary Examiner* — James A Reagan
(74) *Attorney, Agent, or Firm* — Lee Law, PLLC; Christopher B. Lee

(57) ABSTRACT

Mobile device proximity to purchase locations at times of purchases within at least one retail environment is monitored over time by a processor utilizing locationing technology. Mobile device identifiers of mobile devices in proximity to the purchase locations within the at least one retail environment at the times of the purchases are captured. A repeating mobile device proximity pattern of at least two mobile device identifiers being repeatedly located together and in proximity to the respective purchase locations at the times of the respective purchases is detected across several different purchases. Mobile devices identified by the at least two mobile device identifiers detected within the repeating mobile device proximity pattern across the several different purchases are paired.

20 Claims, 8 Drawing Sheets

(56) References Cited

U.S. PATENT DOCUMENTS

2014/0136318 A1 5/2014 Alberth, Jr. et al.
2016/0253710 A1* 9/2016 Publicover ............. G06Q 30/02
                                                      705/14.66

OTHER PUBLICATIONS

Author Unknown, CitiBike: Bike share data in New York, animated, flowingdata.com, Apr. 1, 2014, pp. 1-2, FlowingData, Published online at: http://flowingdata.com/2014/04/01/bike-share-data-in-new-york/.

Stephanie Clifford, et al., Attention, Shoppers: Store Is Tracking Your Cell, The New York Times, NYTimes.com, Jul. 14, 2013, pp. 1-4, The New York Times Company, Published online at: http://www.nytimes.com/2013/07/15/business/attention-shopper-stores-are-tracking-your-cell.html?pagewanted=all&_r=0.

Author Unknown, IBM Cloud: Catalog, IBM.com, Printed from website on May 11, 2015, pp. 1-2, IBM Corporation, Published online at: http://www.ibm.com/cloud-computing/us/en/catalog.html#IBM_Platform_Big-Data.

Author Unknown, re:log: Tracking the Movements of Conference Attendees via WiFi, infosthetics.com, Jun. 18, 2013, pp. 1-2, Information Aesthetics, Published online at: http://infosthetics.com/archives/2013/06/relog_tracking_the_movements_of_conference_attendees_via_wifi.html.

Author Unknown, re:log: Besucherstromanalyse per re:publica W-LAN (English translation not available), opendatacity.de, Printed from website on May 11, 2015, pp. 1-2, OpenDataCity, Published online at: http://apps.opendatacity.de/relog/.

Barbara Thau, How Big Data Helps Stores Like Macy's and Kohl's Track You Like Never Before, Forbes, Jan. 24, 2014, pp. 1-6, Forbes, Inc., Published online at: http://www.forbes.com/sites/barbarathau/2014/01/24/why-the-smart-use-of-big-data-will-transform-the-retail-industry/.

* cited by examiner

DETECTION OF MOBILE DEVICE PAIRING PATTERNS USING TRANSACTIONAL PROXIMITY

BACKGROUND

The present invention relates to detecting patterns of mobile devices being in proximity to each other. More particularly, the present invention relates to detection of mobile device pairing patterns using transactional proximity.

Mobile devices, such as cell phones, provide mobile device users with opportunities to communicate without using land-line telephones. Users of mobile devices may communicate with other mobile device users by placing telephone calls, sending text messages, and by use of other forms of messaging technologies.

BRIEF SUMMARY

A method includes: monitoring, by a processor over time utilizing locationing technology, mobile device proximity to purchase locations at times of purchases within at least one retail environment; capturing mobile device identifiers of mobile devices in proximity to the purchase locations within the at least one retail environment at the times of the purchases; detecting, across several different purchases, a repeating mobile device proximity pattern of at least two mobile device identifiers being repeatedly located together and in proximity to the respective purchase locations at the times of the respective purchases; and pairing mobile devices identified by the at least two mobile device identifiers detected within the repeating mobile device proximity pattern across the several different purchases.

A system that performs the method and a computer program product that causes a computer to perform the method are also described.

DETAILED DESCRIPTION

Figure 1:
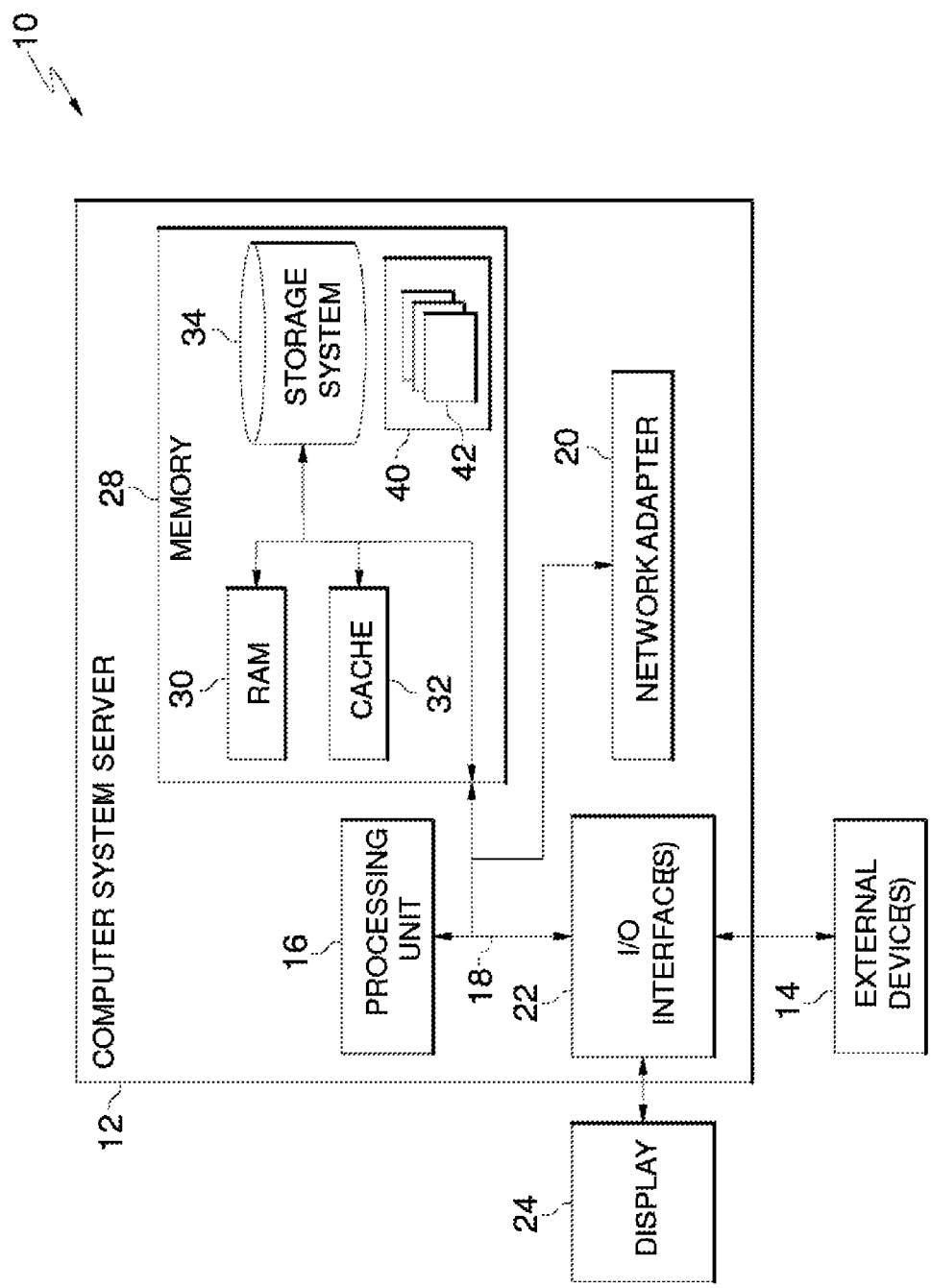
FIG. 1 depicts a cloud computing node according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides detection of mobile device pairing patterns using transactional proximity. The present technology solves a recognized processor occupancy and network bandwidth problem by providing technology that includes a new form of mobile device proximity analysis and computational processing to reduce generation/ processing and sending/reception of non-relevant content (e.g., advertisements, promotions, coupons, etc.) to mobile devices within retail environments. The technology described herein may improve/reduce processing requirements at advertising servers associated with retail environments by reducing generation of non-relevant information and content, and may improve efficiency and reduce memory requirements at advertising servers by reducing the need for storage of non-relevant information or content. The technology described herein may also improve efficiency and reduce network bandwidth requirements by reducing the occurrence within retail environments of information content that is not relevant being sent to mobile device users within retail environments. The technology described herein may additionally improve efficiency and reduce processing requirements at mobile devices within retail environments by not having to receive and process non-relevant information content on the mobile devices, and may improve efficiency and reduce memory requirements of these mobile devices by not requiring the mobile devices to store non-relevant received information content on the mobile devices. As such, the present technology improves many aspects of device design and implementation, and improves communications technology used within retail environments, each by providing opportunities to reduce processor occupancy/ size and memory occupancy/size of devices and communications networks. Additionally, more relevant information and content may be identified through the mobile device pairing patterns detected using transactional proximity by determining the purchasing influence between mobile device users, which may further improve responsiveness by users of mobile devices and thereby improve sales opportunities for retailers.

The present technology operates by monitoring, over time utilizing locationing technology, mobile device proximity to purchase locations at times of purchases within one or more retail environments. Mobile device identifiers of mobile devices in proximity to the purchase locations within the retail environment(s) are captured at the times of the purchases. Across several different purchasing transactions, a repeating mobile device proximity pattern of at least two mobile device identifiers that are repeatedly located together and in proximity to the respective purchase locations at the times of respective purchases is detected. Mobile devices identified by the at least two mobile device identifiers detected within the repeating mobile device proximity pattern across the several different purchases are paired.

The paired mobile devices identified using the locationing technology may again be detected within retail environments during subsequent visits by the respective mobile devices users to the retail environments. The present technology may then additionally operate to identify locations of the mobile devices relative to one another (e.g., users shopping together or shopping separately) and may distribute information content to one or more of the respective paired mobile devices.

For purposes of the present description, the terms "pairing" and "coupling" are utilized interchangeably, and refer to a correlation of two or more mobile devices, such as within a database, based upon detected repeating patterns of proximity of the devices to each other and to point-of-sale (POS) equipment at times of transactions within retail environments. Additionally, a "retail environment" may be considered a single retail location/store (e.g., specialty store, general store, department store, etc.), or may be considered a grouping of individual retail stores (e.g., shopping mall, open market, etc.). The present technology may be implemented as a customized retail-environment specific solution, for example at a single retail location, or may be implemented within or as part of a distributed solution, for example where the retail environment includes a single retail location and/or a grouping of individual retail stores. As such, any combination of retail environments and implementation solutions are considered within the scope of the present subject matter.

For example, the subject matter described herein may identify purchase patterns associated with pairs or groups of people shopping together by programmatically monitoring a series of purchase transactions within one or more retail environments over time, and identifying which mobile devices are co-located within the retail environment(s) at the times of the monitored series of purchase transactions. Mobile device transactional groupings/pairings may be identified in accordance with repeated co-location of the mobile devices within the retail environment(s) at the times of the respective transactions. Using the identified mobile device transactional groupings/pairings, individual mobile device user buying practices when shopping as a group with the respective users of the paired mobile device(s) may be compared with the independent buying practices of the respective mobile device users to determine the influence of the shoppers upon one another's buying patterns when shopping as a group. Targeted information content that is relevant to the respective shoppers' group buying patterns may be delivered to one or more of the paired mobile devices to improve their respective shopping experiences and budgetary concerns while additionally improving sales potentials.

As such, the present technology provides a linked shopping experience across multiple devices within retail environments that reduces processor occupancy/load and bandwidth while improving shopping experiences for shoppers in a manner that would not be possible without use of the technology described herein. The present technology allows improved target marketing to each individual based upon their past experiences and based upon their detected buying patterns when shopping with a mobile device user associated with an identified transactional pairing. The present technology identifies these relationships between mobile devices and develops targeted marketing to that shared mobile device entity.

The present technology also tracks a distance between paired mobile devices. Tracking the distance between paired mobile devices may allow more granular information content delivery opportunities to be identified and sent to the respective paired mobile device(s).

As a first example situation where the present technology may be applied, two siblings may meet routinely for a quarterly shopping trip where their purchase patterns change compared to when they go shopping individually. Similarly, a back-to-school shopping experience for a father and child may be considerably different from a shopping experience for a grandparent with his/her grandchild. In both cases, the likelihood of a purchase may be high, but this likelihood results from the fact that these two people have arrived together.

By utilizing locationing technology, the present technology identifies individual mobile devices and creates patterns by correlating purchases that are made within a retail environment and the mobile devices that are currently located in the retail environment at the time of the purchases/transactions. Once this correlation is established (e.g., over two or three visits/purchase transactions), the mobile device pairing and correlation information may be processed in real time to better market directly to either individual in the correlated set.

In furtherance of the above examples, it may be determined, in response to detection of paired mobile devices within a retail clothing environment, that the purchase of clothing (e.g., sportswear, etc.) increases when two friends shop together, and the present technology may initiate marketing of accessories or shoes to either or both of the two friends to accompany their normal purchases. As another example, based upon a past history of purchase transactions, it may be determined that there is a correlation between the actual physical location of each of the two friends during the shopping duration relative to their respective final purchases (e.g., whether they are shopping together or just car-pooling to the same store in search of separate items). If the two friends stray too far from each other for too long, the present technology may start sending each friend marketing material that brings them back together, such as for example sending one friend a coupon/promotion for the same department that the other friend is located within (e.g., sporting goods, etc.). This form of content interaction may result in the two friends shopping together, which may further leverage the determined influence of the two friends with respect to purchase opportunities (e.g., "That hat looks great on you! Let's use the coupon I was sent to get it for you.").

As another example, a parent and teenage child may be shopping together in a shopping mall but may be shopping in different stores (e.g., parent is shopping in a department store while the teenager is shopping in a young adult specialty clothing store). The present technology may detect the paired mobile devices within the same shopping mall and may forward promotional content directed to items sold in the young adult specialty clothing store to the mobile device of the parent. This may further enhance the possibility that the parent will join the teenage child in the young adult specialty clothing store and purchase items for associated with the promotional content.

Regarding the mobile device tracking within retail environments, the mobile device tracking may be performed using locationing technology (e.g., Bluetooth low energy (BLE) beacons, triangulation, proximity, etc.) to identify locations of mobile devices within retail environments. This locationing information/data once obtained may be fed back into an analytics processing engine. The obtained locationing information/data may include every mobile device identifier (ID) that enters the store and every cash register or point-of-sale (POS) transaction.

Mobile device IDs within a defined radius (e.g., within two or three meters) of the cash register may be gathered to assist with detection and pairing of the identified devices. For example, the present technology may assign a higher coupling/pairing coefficient for devices that check out as part of a transaction together. It should additionally be noted that mobile devices (e.g., cell phones and other devices) of the store staff within the store may be removed from this data to remove these device identifiers from the resulting device pairings (e.g., may be referred to as "blacklisting" the store staff mobile devices).

The device pairings and the transaction information may be stored and analyzed within cloud computing technology or otherwise as appropriate to determine a data point referred to herein as a "coupling data point" or "pairing data point." This coupling/pairing data point may be determined by analyzing historical records of the two aforementioned items of data (e.g., every mobile device ID and every cash register transaction). The data analytics may identify mobile device IDs (e.g., two or more) found together in the retail environment when purchases are made. With this information, a new algorithm for predictive analytics may be utilized as described herein. The coupling data point provides retail environments with mobile device IDs to which to send targeted and timely advertisements/promotions to consumers determined to have a higher probability of making a purchase.

The present technology may also identify additional information between the two or more paired mobile devices to further improve delivery of relevant targeted messages. For example, if the back-end user profiling system infers based upon historical analysis of purchase transactions that two shoppers have a parent/child relationship, wish list information from the child may be filtered to the parent as part of the marketing promotion.

As a further example, where three friends go shopping together, it may be determined that they always buy something. Each friend has a mobile device. When these three (3) mobile devices are together or "coupled," retail environment servers may target the friend with a higher likelihood of purchase. Cross sell and or upsell opportunities may also exist based upon the knowledge derived from the device pairings and the transactions related to the paired mobile devices over time.

It should be noted that conception of the present subject matter resulted from recognition of certain limitations associated with targeting information content to mobile device users within retail environments. For example, it was observed that it is difficult within retail environments to determine what types of content to send to shoppers in real time while they are shopping, and that shoppers may become annoyed if they receive information content that is not relevant to their interests. It was additionally determined that generating and sending non-relevant information content to shopping customers consumed processing and memory resources of both the advertising servers and the shopper's mobile devices, and consumed processing and memory resources of wireless transmission and reception processors, each in addition to unnecessarily increasing the bandwidth requirements of the wireless communication devices. It was determined that new technology to evaluate and identify patterns between the presence of pairs/groups of mobile devices and purchases within retail environments may be utilized to identify repeating mobile device pairings, and to enhance targeting of relevant information content and promotions to users of the paired mobile devices. However, it was determined that because many mobile device users utilize different mobile phone service providers, previous technologies did not provide information by which to determine associations/correlations between mobile devices/users. For example, the same consumers may be in the same retail establishment repeatedly, yet have no actual association with one another. It was recognized that, in contrast, users often stand together with friends and/or family during checkout for their respective purchases. By determining mobile device pairings at the time of transactions and over time, true mobile device pairings and purchase histories that are independent of mobile phone service providers may be determined. Further, influence of persons carrying the respective paired mobile devices may be determined in accordance with the detected transactions (purchase histories) during the times of detected device proximity, and determination of influence may be refined and improved over time as additional transactions with detected proximity of paired mobile devices are detected. From these several observations and determinations, it was further determined that processor consumption and memory consumption may be reduced on advertising servers and on mobile devices by providing targeted information content that is of relevance to the mobile device users, rather than requiring processing and storage of non-relevant information content. The present subject matter improves processor utilization and memory utilization by detection of mobile device pairing patterns using transactional proximity, as described above and in more detail below. As such, improved processor utilization and memory utilization may be obtained through use of the present technology.

The detection of mobile device pairing patterns using transactional proximity described herein may be performed in real time to allow prompt detection of mobile device pairings within retail environments and targeting of relevant information content to paired mobile devices. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

As described above, the present technology may be implemented within or as part of a distributed cloud computing environment (e.g., for data analytics), or may be implemented as a customized retail-environment specific solution. As such, examples of implementations for both environments are included herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
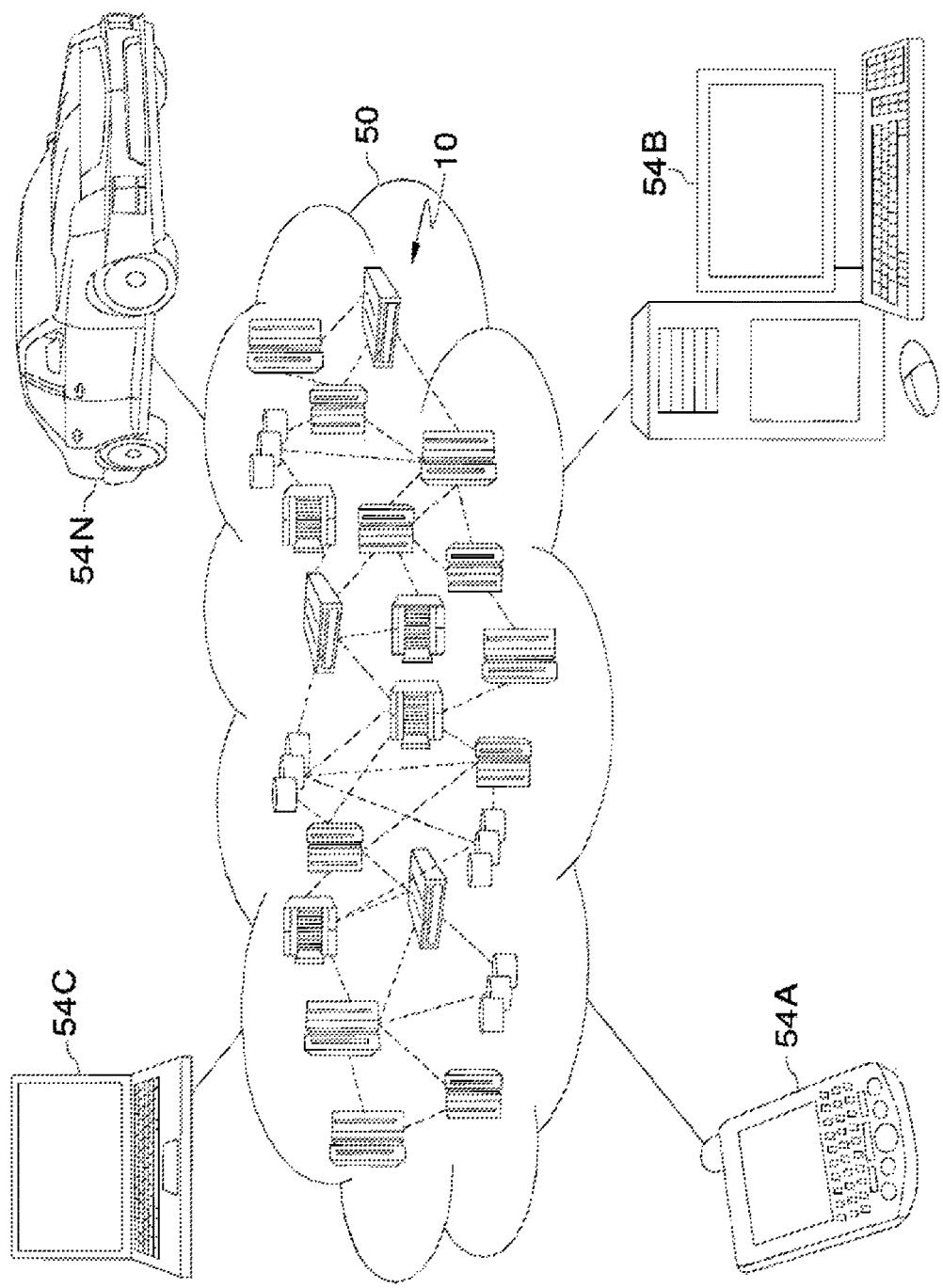
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
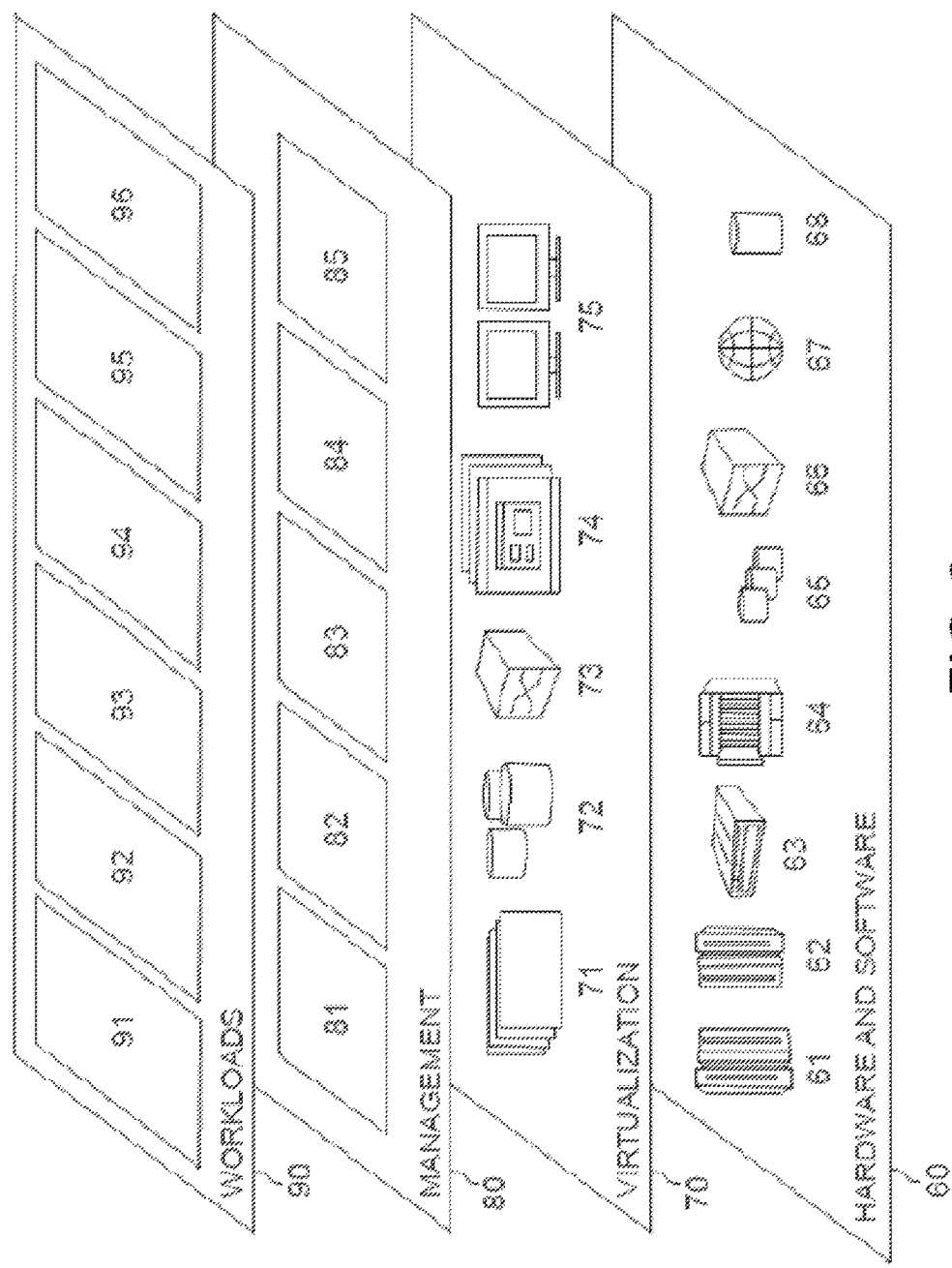
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detection of mobile device pairing patterns using transactional proximity 96.

Regarding alternative implementation options, FIGS. 4 and 5 below are directed to such alternatives. It should be understood that the various alternatives may be combined with or substituted with the implementation options described above, as appropriate for the given implementation.

Figure 4:
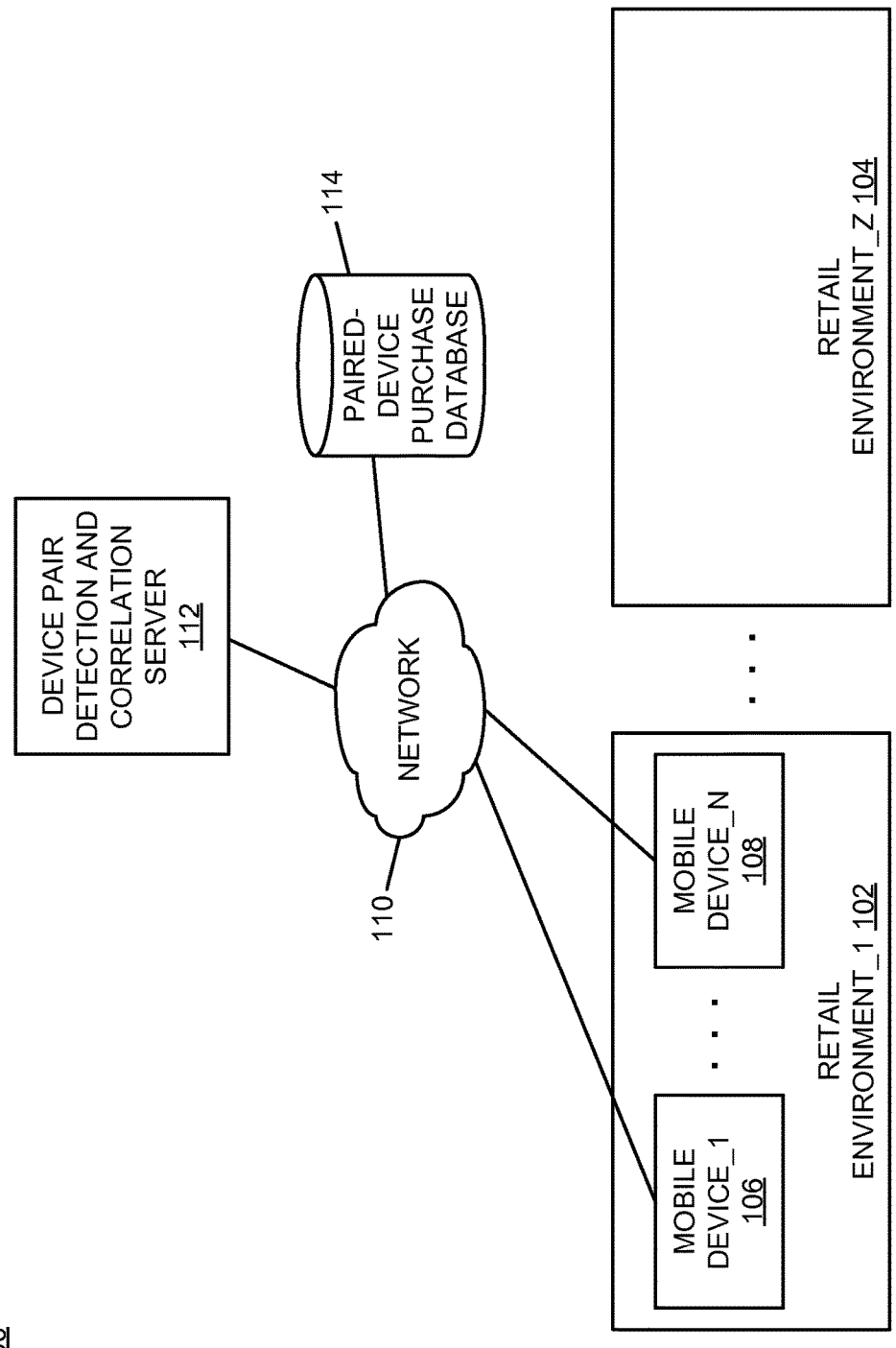
FIG. 4 is a block diagram of an example of an implementation of a system for detection of mobile device pairing patterns using transactional proximity according to an embodiment of the present subject matter.

FIG. 4 is a block diagram of an example of an implementation of a system 100 for detection of mobile device pairing patterns using transactional proximity. The system 100 may be implemented within a single retail environment_1 102, or may be implemented across a plurality of retail environments represented as the retail environment_1 102 through a retail environment_Z 104.

A mobile device_1 106 through a mobile device_N 108 communicate via a network 110 and may communicate with other devices. The mobile device_1 106 through the mobile device_N 108 represent two or more devices that are illustrated for purposes of the present description within the retail environment_1 102. However, it is understood that the mobile devices users may travel over time to any of the retail environment_1 102 through the retail environment_Z 104. The users of the mobile device_1 106 through the mobile device_N 108 may make purchase transactions within the respective retail environments.

Over time, a device pair detection and correlation (DPDC) server 112 may detect repeating patterns of particular mobile devices within retail environments at the time of transactions, and may from this detected repeating pattern identify mobile device pairings among the respective mobile devices, such as by detection of the same mobile devices together in repeated proximity to one another at times of purchase transactions.

The DPDC server 112 may store detected pairings of mobile devices within a paired-device purchase (PDP) database 114. The PDP database 114 may also be used for storage of analytics, relevant information content (e.g., advertisements, promotions, coupons, etc.) determined based upon identified device pairings and influence of respective mobile device users on one another's purchase likelihoods, and other information as appropriate for a given implementation.

The DPDC server 112 may detect mobile devices within one or more of the retail environment_1 102 through the retail environment_Z 104 as repeatedly paired in association with purchase transactions using any appropriate locationing technology. For example, Bluetooth low energy (BLE) technology, Wireless Fidelity (WiFi) sensors, and other technologies may be utilized as appropriate for a given implementation.

The DPDC server 112 may also perform analytics on paired-device purchase transactions to identify mobile device user purchase profiles that distinguish between purchase likelihoods when the mobile devices users are paired in association with shopping experiences versus when the respective mobile device users are shopping independently (e.g., either at different times or separately within the same retail environment at the same time). The DPDC server 112 may further determine/infer from these transactional analytics a purchasing influence between mobile device users when the users are shopping together. Based upon this determined or inferred influence, advertising/promotions may be targeted to one or more mobile device users of detected paired devices during shopping experiences where known-paired mobile devices are again detected within a retail environment (e.g., whether in close proximity to one another or separated by a distance that suggests they are shopping independently). As described above, the DPDC server 112 may store information related to its processing and communication activities within the PDP database 114.

Additionally, the DPDC server 112 may be located in one retail environment, may be distributed and operate as multiple servers in multiple retail environments, or may be located outside of one or more retail environments (e.g., and may utilize cloud computing as described above). As such, many options for implementation of the present technology are possible, and all such options are considered to be within the scope of the description herein.

As will be described in more detail below in association with FIG. 5 through FIG. 8, the device pair detection and correlation (DPDC) server 112 may provide automated detection of mobile device pairing patterns using transactional proximity. The automated detection of mobile device pairing patterns using transactional proximity is based upon identification of purchase patterns associated with user(s) of one or more mobile devices repeatedly located in close proximity at the time of the purchase transactions. From this detected repeating pattern of mobile devices located in close proximity at the time of the purchase transactions, mobile device user pairings and influence upon sales transactions may be determined, and users of paired mobile devices may be provided with purchasing incentives (e.g., coupons, etc.) to further benefit the respective mobile device users and to augment transactions with additional complementary purchases (e.g., accessories and other related additional items). The present technology may be implemented at a user computing device or server device level, or by a combination of such devices as appropriate for a given implementation. A variety of possibilities exist for implementation of the present subject matter, and all such possibilities are considered within the scope of the present subject matter.

The network 110 may include any form of interconnection suitable for the intended purpose, including a private or public network such as an intranet or the Internet, respectively, direct inter-module interconnection, dial-up, wireless, or any other interconnection mechanism capable of interconnecting the respective devices. Additionally, the network 110 may include Bluetooth low energy (BLE) technology, Wireless Fidelity (WiFi) sensors, and other technologies that allow detection of the respective mobile devices and respective proximities of the mobile devices relative to one another within retail environments.

As additional examples of distance and location detection for mobile devices, triangulation, proximity, BLE beaconing, or other technologies may be utilized. For triangulation, a mobile device may look for a wireless signal within a retail environment, and may broadcast (e.g., ping) its media access control (MAC) address over time while the mobile device is in the retail environment. Sensors distributed within the retail environment may pick up the MAC address ping and a determination of where the mobile device is located may be performed by triangulation using grid coordinates (e.g., x-y coordinates) between the sensors. The sensors may include access points that utilize density of a received signal strength indicator (RSSI) to determine within reasonable accuracy relative locations of the mobile devices from the sensors.

Regarding proximity, sensors may alternatively gather all RSSI data and may determine by relative measure how far away devices are. Proximity and similar techniques may identify locations within two to three (2-3) meters for a particular device.

Regarding BLE beaconing, BLE beacon devices may be distributed throughout a retail environment and may generate BLE beacon signals that communicate with the mobile device. The respective BLE beacons may transmit a unique identifier (e.g., a UID) along with its location within the retail environment. A mobile device application may detect the BLE beacon and open an application for the particular retail environment. The BLE beacon detection in combination with the retail environment-specific application may track the location of the mobile device within the retail environment. Additionally, triangulation using the respective BLE beacons may be performed.

Collectively or individually, the different forms of distance and location detection for mobile devices may be utilized to determine where multiple devices are located within the retail environment. As transactions are made within the retail environment at a point of sale (POS) terminal (e.g., cash register, terminal, or check-out device), multiple devices with close proximity to the POS terminal may be detected and correlated with the particular transaction. Over time and across several different purchases, as described above and in more detail below, a repeating mobile device proximity pattern may be detected and utilized to recognize the paired mobile devices during additional/subsequent shopping experiences within the same or another retail environment.

The device pair detection and correlation (DPDC) server 112 may include any device capable of performing the subject matter described herein. As such, the device pair detection and correlation (DPDC) server 112 may include an analytics server, a marketing server, a web server, an application server, or other data server device.

The paired-device purchase (PDP) database 114 may include a relational database, an object database, or any other storage type of device. As such, the paired-device purchase (PDP) database 114 may be implemented as appropriate for a given implementation.

Figure 5:
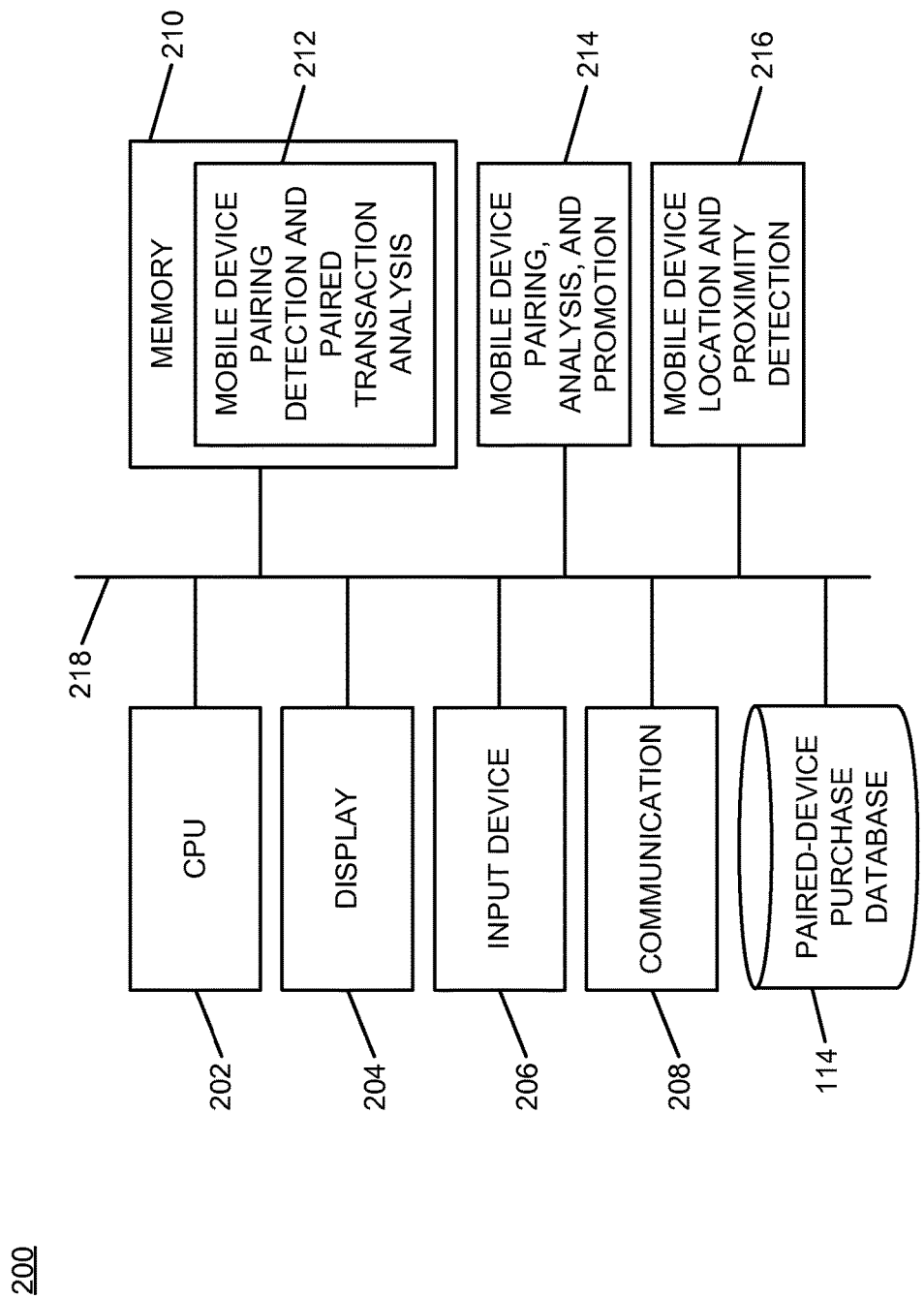
FIG. 5 is a block diagram of an example of an implementation of a core processing module capable of detection of mobile device pairing patterns using transactional proximity according to an embodiment of the present subject matter.

FIG. 5 is a block diagram of an example of an implementation of a core processing module 200 capable of detection of mobile device pairing patterns using transactional proximity. The core processing module 200 may be associated with the device pair detection and correlation (DPDC) server 112, and certain components may be associated with the mobile device_1 106 through the mobile device_N 108, as appropriate for a given implementation. As such, the core processing module 200 is described generally herein, though it is understood that many variations on implementation of the components within the core processing module 200 are possible and all such variations are within the scope of the present subject matter. Reference is again made to FIG. 1, described above, for additional details and options of a cloud computing node that may be utilized to implement the technology described herein.

Further, the core processing module 200 may provide different and complementary processing of device pairing and other information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a touchscreen, or other display element or panel. The input device 206 may include a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a mobile device pairing detection and paired transaction analysis storage area 212 that stores mobile device pairings that are detected over time along with transactional analytics information within the core processing module 200. As will be described in more detail below, information stored within the mobile device pairing detection and paired transaction analysis storage area 212 is used to determine mobile device pairings, to determine relative purchasing influence between users of paired mobile devices, and to determine relevant focused information content to deliver to one or more of the paired mobile devices at times when known-paired devices are detected within a retail environment.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A mobile device pairing, analysis, and promotion module 214 is also illustrated. The mobile device pairing, analysis, and promotion module 214 implements the automated detection of mobile device pairing patterns using transactional proximity and the additional analytical processing for mutual user purchasing influence and relevant promotional processing of the core processing module 200.

It should also be noted that the mobile device pairing, analysis, and promotion module 214 may form a portion of other circuitry described without departure from the scope of the present subject matter. Further, the mobile device pairing, analysis, and promotion module 214 may alternatively be implemented as an application stored within the memory 210. In such an implementation, the mobile device pairing, analysis, and promotion module 214 may include instructions executed by the CPU 202 for performing the functionality described herein. The CPU 202 may execute these instructions to provide the processing capabilities described above and in more detail below for the core processing module 200. The mobile device pairing, analysis, and promotion module 214 may form a portion of an interrupt service routine (ISR), a portion of an operating system, a portion of a browser application, or a portion of a separate application without departure from the scope of the present subject matter.

A mobile device location and proximity detection module 216 provides mobile device positioning and proximity information usable for identifying mobile device pairings in association with purchase transactions. The mobile device location and proximity detection module 216 may communicate with distributed mobile device location equipment (not shown) within a retail environment, and location information of detected mobile devices may be provided to the mobile device pairing, analysis, and promotion module 214 for device pairing determinations, analytics, and promotions, each as described above. The distributed mobile device location equipment may include technology as described above to interact with, transmit, and/or detect locationing information (e.g., WiFi, BLE beaconing, etc.).

The paired-device purchase (PDP) database 114 is again shown within FIG. 5 associated with the core processing module 200. As such, the paired-device purchase (PDP) database 114 may be operatively coupled to the core processing module 200 without use of network connectivity, as appropriate for a given implementation.

The CPU 202, the display 204, the input device 206, the communication module 208, the memory 210, the mobile device pairing, analysis, and promotion module 214, the mobile device location and proximity detection module 216, and the paired-device purchase (PDP) database 114 are interconnected via an interconnection 218. The interconnection 218 may include a system bus, a network, or any other interconnection capable of providing the respective components with suitable interconnection for the respective purpose.

Though the different modules illustrated within FIG. 5 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the paired-device purchase (PDP) database 114 is illustrated as a separate component for purposes of example, the information stored within the paired-device purchase (PDP) database 114 may also/alternatively be stored within the memory 210 without departure from the scope of the present subject matter. Accordingly, the core processing module 200 may take many forms and may be associated with many platforms.

Figure 6:
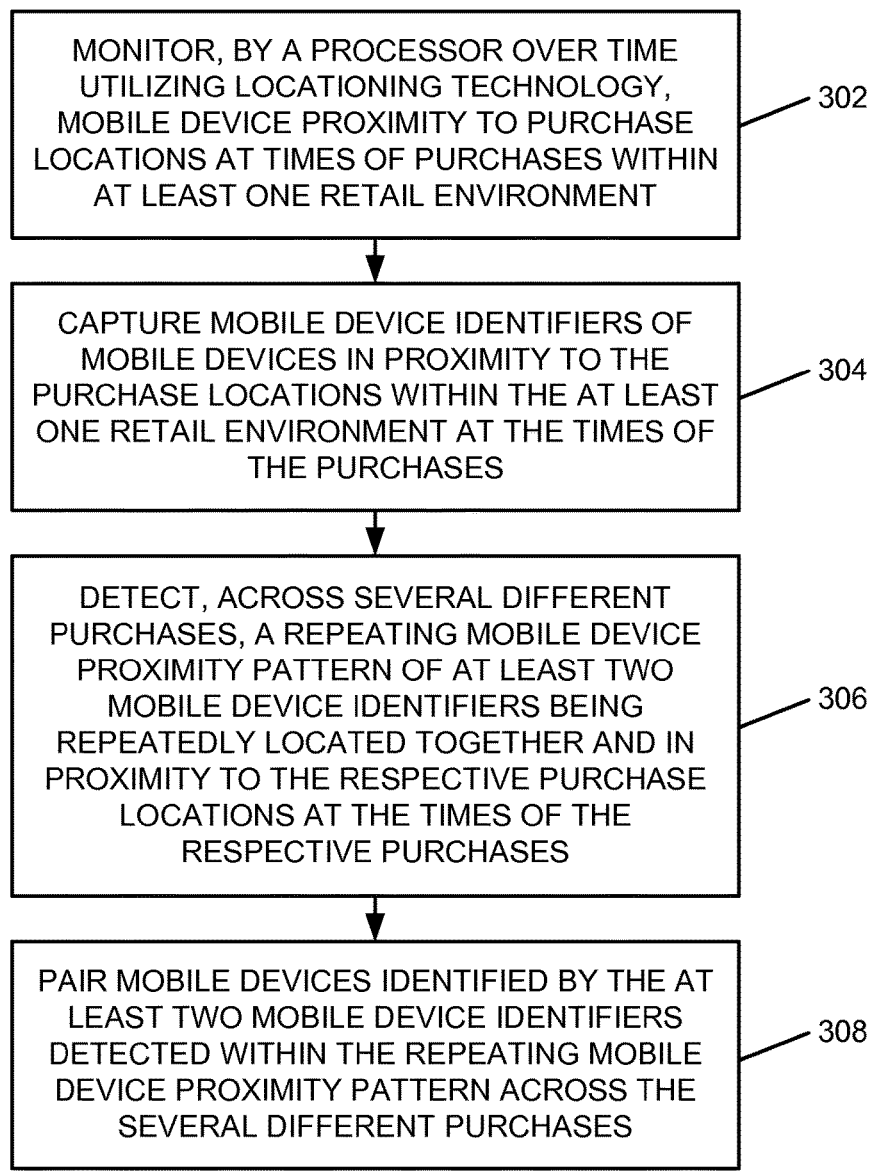
FIG. 6 is a flow chart of an example of an implementation of a process for detection of mobile device pairing patterns using transactional proximity according to an embodiment of the present subject matter.
Figure 7:
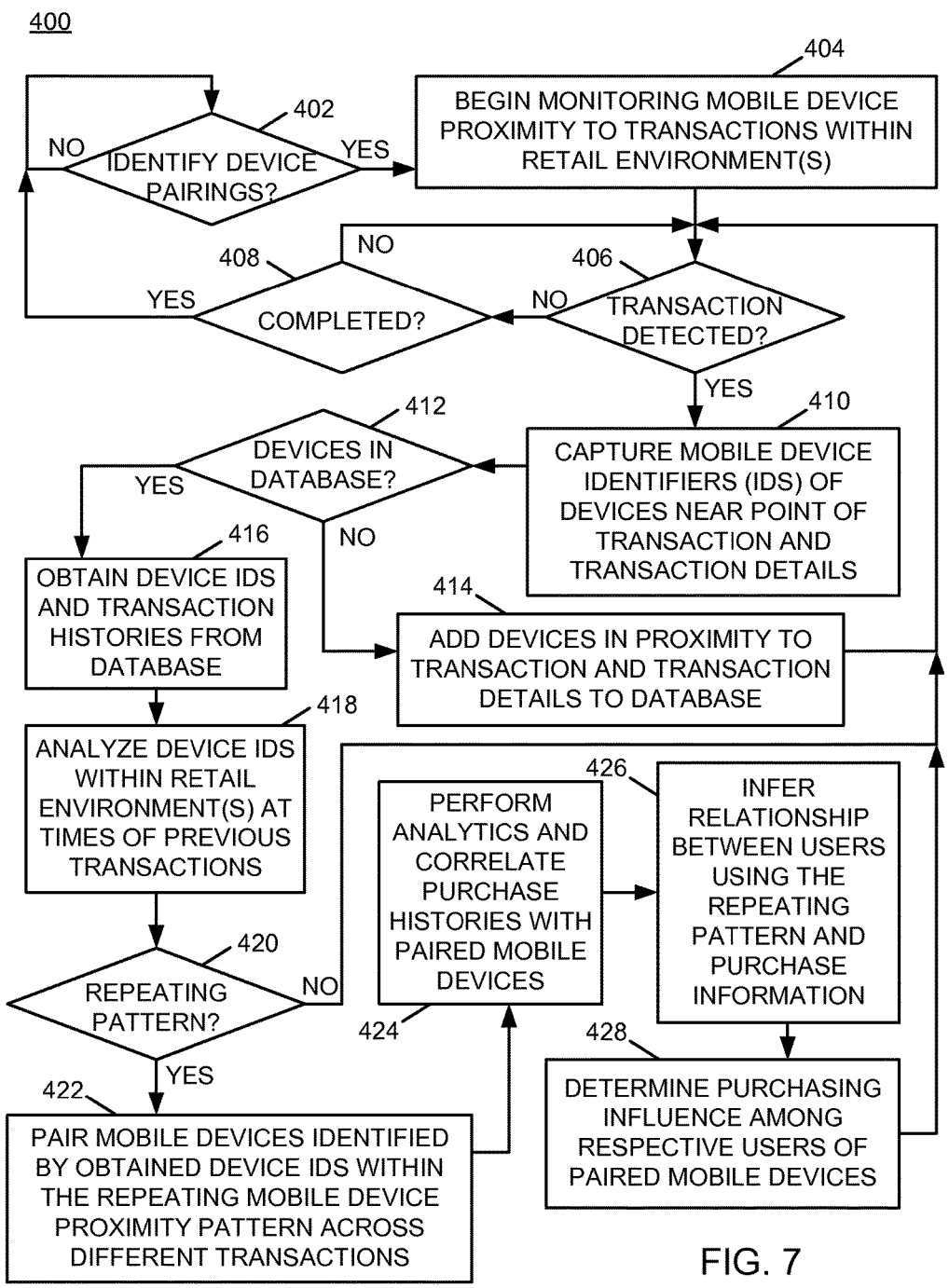
FIG. 7 is a flow chart of an example of an implementation of a process for detection of mobile device pairing patterns using transactional proximity according to an embodiment of the present subject matter.
Figure 8:
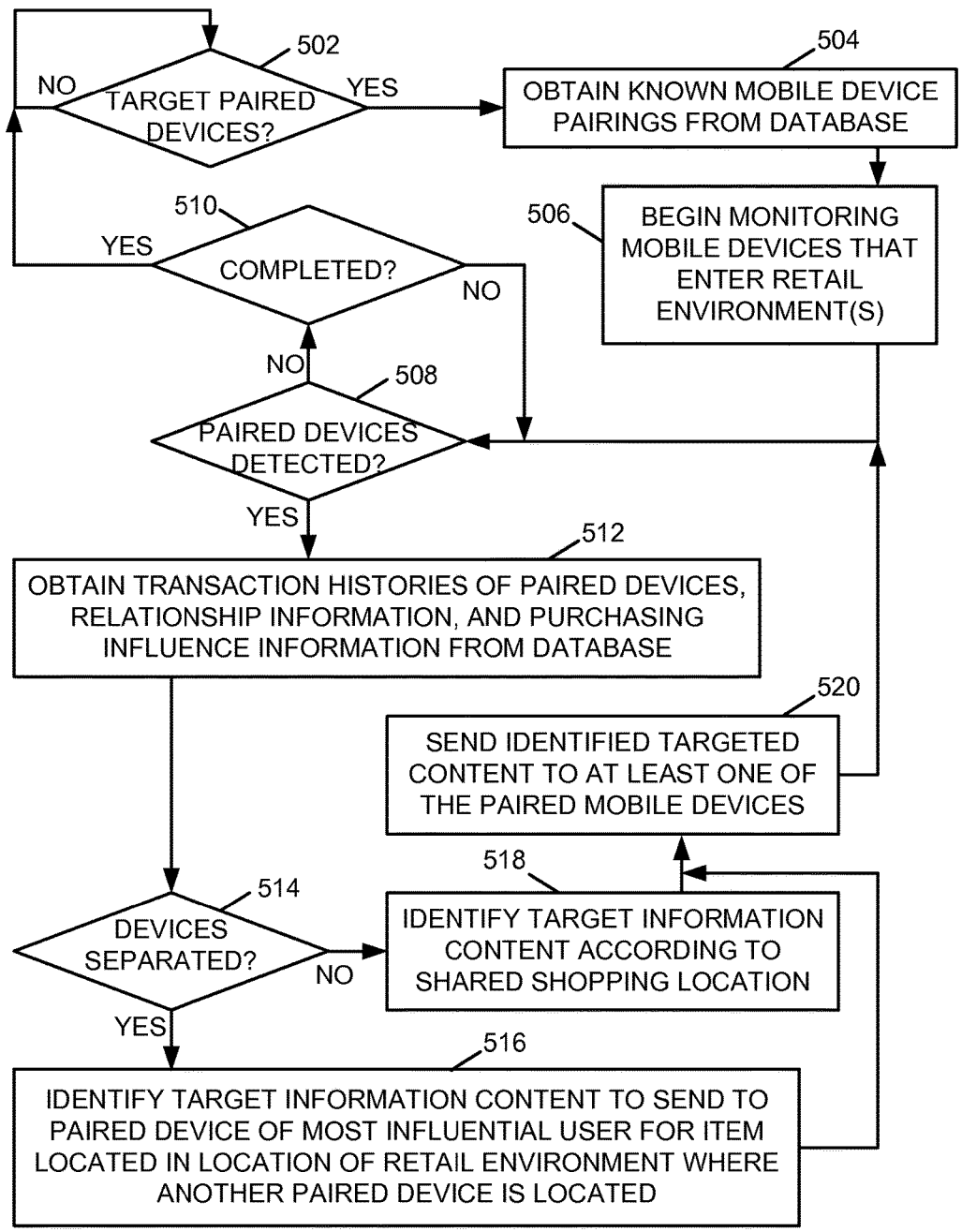
FIG. 8 is a flow chart of an example of an implementation of a process for targeting paired mobile devices with information content in response to detection of mobile device pairing patterns using transactional proximity according to an embodiment of the present subject matter.

FIG. 6 through FIG. 8 described below represent example processes that may be executed by devices, such as the core processing module 200, for detection of mobile device pairing patterns using transactional proximity associated with the present subject matter. Many other variations on the example processes are possible and all are considered within the scope of the present subject matter. The example processes may be performed by modules, such as the mobile device pairing, analysis, and promotion module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 300 for detection of mobile device pairing patterns using transactional proximity. The process 300 represents a processor-implemented method of performing the mobile device pairing analysis described herein. At block 302, the process 300 monitors, by a processor over time utilizing locationing technology, mobile device proximity to purchase locations at times of purchases within at least one retail environment. At block 304, the process 300 captures mobile device identifiers of mobile devices in proximity to the purchase locations within the at least one retail environment at the times of the purchases. At block 306, the process 300 detects, across several different purchases, a repeating mobile device proximity pattern of at least two mobile device identifiers being repeatedly located together and in proximity to the respective purchase locations at the times of the respective purchases. At block 308, the process 300 pairs mobile devices identified by the at least two mobile device identifiers detected within the repeating mobile device proximity pattern across the several different purchases.

FIG. 7 is a flow chart of an example of an implementation of a process 400 for detection of mobile device pairing patterns using transactional proximity. The process 400 represents a processor-implemented method of identifying mobile device pairing patterns described herein. At decision point 402, the process 400 makes a determination as to whether a request to identify mobile device pairings has been detected. A request to identify mobile device pairings may be detected, for example, at startup of a device such as the DPDC server 112, or otherwise as appropriate for a given implementation. In response to determining that a request to identify mobile device pairings has been detected, the process 400 begins monitoring mobile device proximity to transactions (e.g., purchases) within one or more retail environments, as appropriate for the given implementation, at block 404. It should be understood that the process 400 may monitor one retail environment for an environment-specific implementation, or may monitor multiple retail environments for distributed or cloud-based implementations.

At decision point 406, the process 400 makes a determination as to whether a transaction (i.e., purchase) has been detected. In response to determining that a transaction has not been detected, the process 400 makes a determination at decision point 408 as to whether processing to identify mobile device pairings has been completed. In response to determining that processing has not been completed, the process 400 returns to decision point 406 and iterates as described above.

In response to determining at decision point 406 that a transaction has been detected, the process 400 captures mobile device identifiers (IDs) of mobile devices in proximity to the transaction location within the retail environment and the transaction details at the time of the purchase at block 410. Proximity to a purchase/transaction location may be based on and determined to be within a configured radius or distance (e.g., within three feet, within ten feet, etc.) to a point-of-sale (POS) device, such as a cash register, terminal, or check-out device, or within a purchase area of the retail environment.

At decision point 412, the process 400 makes a determination as to whether the detected mobile devices are in a database of mobile device pairings and transaction information, such as the PDP database 114. In response to determining that the detected mobile devices are not in the database of mobile device pairings and transaction information, the process 400 adds the devices in proximity to the transaction and transaction details to the database of mobile device pairings and transaction information at block 414. It should be noted that as device pairings and transaction details are added to the database of mobile device pairings and transaction information and as additional transactions are detected, repeating mobile device proximity patterns of mobile device identifiers being repeatedly located together and in proximity to the respective purchase locations at times of respective purchases may be detected, as described in more detail below. The process 400 returns to decision point 406 and iterates as described above.

Returning to the description of decision point 412, in response to determining that the detected mobile devices are in the database of mobile device pairings and transaction information, the process 400 obtains device identifiers (IDs) and transaction histories of the respective devices from the database of mobile device pairings and transaction information. The information for each mobile device may include purchase history, visit history, and other information. At block 418, the process 400 analyzes data associated with the device IDs captured within one or more different retail environments at times of previous transactions. For example, the process 400 may analyze data for all mobile devices, such as dates/times of previous transactions, previous purchase histories, social media metrics, and other information.

At decision point 420, the process 400 makes a determination as to whether a repeating mobile device proximity pattern has been detected. As described above and in more detail below, a repeating mobile device proximity pattern is detected in response to determining that the same mobile devices are in close proximity to a POS device within a retail environment and that the same mobile devices have also been in close proximity to one another and a POS device on at least one prior occasion. In response to determining that a repeating mobile device proximity pattern has not been detected, the process 400 returns to decision point 406 and iterates as described above.

Alternatively, in response to determining that a repeating mobile device proximity pattern has been detected, the process 400 pairs the respective mobile devices identified by the two mobile device identifiers detected within the repeating mobile device proximity pattern across the several different transactions at block 422. Pairing of the respective devices may include creating a phone identifier (ID) coupling record in the database of mobile device pairings and transaction information.

At block 424, the process 400 performs analytics and correlates purchase histories with the paired mobile devices. The analytics may include evaluation of the respective transaction histories of the respective paired mobile devices. The analytics may yield information about individual purchasing patterns relative to purchasing patterns when the paired mobile devices are detected to both be within the same retail environment at times of different purchases. This information derived from the analytics may be further correlated with the paired mobile devices.

At block 426, the process 400 infers a relationship between users of the paired mobile devices using the repeating pattern and purchase information. The relationship may be inferred, for example, based upon information derived from the detected repeating mobile device proximity pattern and the several different purchases. Relationships, such as adult/child, peers/friends, roommates, co-workers, and other relationships, may be inferred in accordance with the types of purchases made when the users are together, and may further be enhanced by comparison with types of purchases made when the users are shopping individually.

At block 428, the process 400 determines a purchasing influence among the respective users of the paired mobile devices. For example, the process 400 may determine a purchasing influence of at least one user of one of the paired mobile devices on a user of another one of the paired mobile devices in accordance with differences between the product categories purchased by the users of the paired mobile devices while shopping together relative to the product categories purchased by the users of the paired mobile devices while shopping separately. As described above, the process 400 may utilize the purchase histories associated with each of the paired mobile devices to determine the respective influence of the users upon the others' purchases. The process 400 returns to decision point 406 and iterates as described above. As also described above, in response to determining that processing is completed at decision point 408, the process 400 returns to decision point 402 and iterates as described above.

As such, the process 400 operates over time to utilize locationing technology to programmatically detect repeating mobile device proximity patterns of mobile device identifiers being repeatedly located together and in proximity to the respective purchase locations at times of purchase transactions. Mobile devices are paired in response to detecting the repeating mobile device proximity patterns. Further, relationships between users of the mobile devices and purchasing influence among the users may be inferred and determined using comparisons of purchase histories associated with the respective mobile devices when together and when apart at times of transactions.

FIG. 8 is a flow chart of an example of an implementation of a process 500 for targeting paired mobile devices with information content in response to detection of mobile device pairing patterns using transactional proximity. The process 500 represents a processor-implemented method of targeting known mobile device pairs described herein. At decision point 502, the process 500 makes a determination as to whether a request to target paired mobile devices with information content has been detected. A request to target paired mobile devices with information content may be detected, for example, in response to startup of a device such as the DPDC server 112, or otherwise as appropriate for a given implementation. In response to determining that a request to target paired mobile devices with information content has been detected, the process 500 obtains known mobile device pairings from a database of mobile device pairings and transaction information, such as the PDP database 114, at block 504. At block 506, the process 500 begins monitoring mobile devices that enter one or more retail environments. It should be understood that the process 500 may monitor one retail environment for an environment-specific implementation, or may monitor multiple retail environments for distributed or cloud-based implementations.

At decision point 508, the process 500 makes a determination as to whether known paired mobile devices have been detected within a retail environment. The process 500 may detect, in real time within a retail environment, a presence of each of the paired mobile devices of a known mobile device pairing.

In response to determining that known paired mobile devices have not been detected within a retail environment, the process 500 makes a determination at decision point 510 as to whether processing to target paired mobile devices with information content is completed. In response to determining that processing to target paired mobile devices with information content is not completed, the process 500 returns to decision point 508 and iterates as described above.

In response to determining at decision point 508 that known paired mobile devices have been detected within a retail environment, the process 500 begins processing to target information content to the respective devices of the known paired mobile devices. The process 500 may utilize information derived from the detected repeating mobile device proximity pattern and the several different purchases that correspond to the repeating mobile device proximity pattern to target content delivery to at least one of the paired mobile devices.

At block 512, the process 500 obtains transaction histories of the paired mobile devices, inferred relationship information of the users of the respective devices, and purchasing influence information among the users from a database of mobile device pairings and transaction information, such as the PDP database 114. At decision point 514, the process 500 makes a determination as to whether the paired mobile devices are separated within the retail environment.

In response to determining that the paired mobile devices are separated within the retail environment at decision point 514, the process 500 identifies target information content to send to the paired device of the most influential user for an item located in a location of the retail environment where another paired mobile device is located at block 516. As such, the process 500 may identify information content (e.g., a promotion, discount, etc.) that the most-influential user may recognize to be of interest to the other mobile device user within the location where the other mobile device user is already shopping, which may cause the most-influential user to go to the location of the other mobile device user with the information content. The most-influential user may share the information content with the other mobile device user and may assist the other mobile device user with selection of a size, color, or other feature of the item.

Alternatively, in response to determining that the paired mobile devices are not separated within the retail environment at decision point 514 (e.g., they are shopping together), the process 500 identifies information content according to the shared shopping location at block 518. For example, the process 500 may identify one of a primary product category and an accessory product category routinely purchased by a user of at least one of the paired mobile devices during paired shopping experiences of users of the paired mobile devices using transaction histories of the paired mobile devices, and may identify information content (e.g., again promotions, discounts, etc.) that enhance savings for the mobile device users when items are purchased together.

In response to either identifying target information content to send to the paired device of the most influential user at block 516, or in response to identifying the information content according to the shared shopping location at block 518, the process 500 sends the identified information content to at least one of the paired mobile devices at block 520. The selected mobile device to which to send the information content may include, for example, the most influential user of the group. The process 500 returns to decision point 508 and iterates as described above. It should be understood that the processing to obtain the information at block 512 may be omitted for subsequent iterations of the process 500 for the same devices as the devices are detected to move through the retail environment. In response to determining that processing is completed at decision point 510, the process 500 returns to decision point 502 and iterates as described above.

As such, the process 500 detects known pairs of mobile devices entering retail environments. The process 500 obtains transactional histories of the paired devices, inferred relationship information, and purchasing influence information derived using a process such as the process 400 described above. The process 500 determines whether the devices are together or apart within the retail environment over time, and identifies targeted content to deliver to one or more of the known paired mobile devices to enhance the users' shopping experience with relevant information that may assist the mobile device users.

As described above in association with FIG. 1 through FIG. 8, the example systems and processes provide detection of mobile device pairing patterns using transactional proximity. Many other variations and additional activities associated with detection of mobile device pairing patterns using transactional proximity are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
 establishing, utilizing locationing technology, at least one configured mobile device monitoring radius relative to respective purchase locations within at least one retail environment;
 monitoring, by a processor over time utilizing the locationing technology, mobile device distances from the purchase locations at times of purchases within the at least one retail environment;
 capturing mobile device identifiers of mobile devices located within the configured mobile device monitoring radius of the respective purchase locations within the at least one retail environment at the times of the purchases;
 detecting, across several different purchases, a repeating mobile device proximity pairing pattern of at least two mobile device identifiers being repeatedly located together within the configured mobile device monitoring radius of the respective purchase locations associated with the different purchases at the times of the respective different purchases; and
 pairing mobile devices identified by the at least two mobile device identifiers detected within the repeating mobile device proximity pairing pattern across the several different purchases.

2. The method of claim 1, further comprising:
 capturing purchase histories in accordance with the purchases; and
 correlating the captured purchase histories with the paired mobile devices.

3. The method of claim 1, further comprising:
 detecting, in real time within a retail environment, a presence of each of the paired mobile devices; and
 utilizing information derived from the detected repeating mobile device proximity pairing pattern and the several different purchases that correspond to the repeating mobile device proximity pairing pattern to target content delivery to one of the paired mobile devices, where content delivery bandwidth is reduced by sending any particular targeted content to the one of the paired mobile devices.

4. The method of claim 3, where utilizing the information derived from the detected repeating mobile device proximity pairing pattern and the several different purchases that correspond to the repeat mobile device proximity pairing pattern to target the content delivery to the one of the paired mobile devices comprises:
 identifying, using transaction histories of the paired mobile devices, one of a primary product category and an accessory product category routinely purchased by a user of a different one of the paired mobile devices during paired shopping experiences of users of the paired mobile devices; and
 identifying the target content to deliver to the one of the paired mobile devices as a promotion of one of a product in one of the primary product category and the accessory product category routinely purchased by the user of the different one of the paired mobile devices during the paired shopping experiences.

5. The method of claim 1, further comprising:
 inferring a relationship between users of the paired mobile devices based upon information derived from the detected repeating mobile device proximity pairing pattern across the several different purchases.

6. The method of claim 1, further comprising:
 determining a purchasing influence of at least one user of one of the paired mobile devices on a user of another one of the paired mobile devices utilizing purchase histories associated with each of the paired mobile devices that identify differences between product categories purchased by the users of the paired mobile devices while shopping together relative to the product categories purchased by the users of the paired mobile devices while shopping separately.

7. The method of claim 1, further comprising:
 detecting, in real time within a retail environment of the at least one retail environment, a presence of each of the paired mobile devices;
 determining, using the locationing technology, that the mobile devices have separated within the retail environment; and
 sending a promotion to one of the paired mobile devices for an item located in a location of the retail environment where another of the paired mobile devices is located, where processing load of the processor is reduced by sending the promotion to the one of the paired mobile devices.

8. A system, comprising:
 a memory; and
 a processor programmed to:
  establish, utilizing locationing technology, at least one configured mobile device monitoring radius relative to respective purchase locations within at least one retail environment;
  monitor, over time utilizing the locationing technology, mobile device distances from the purchase locations at times of purchases within the at least one retail environment;
  capture mobile device identifiers of mobile devices located within the configured mobile device monitoring radius of the respective purchase locations within the at least one retail environment at the times of the purchases;
  detect, across several different purchases, a repeating mobile device proximity pairing pattern of at least two mobile device identifiers being repeatedly located together within the configured mobile device monitoring radius of the respective purchase locations associated with the different purchases at the times of the respective different purchases; and
  pair within the memory mobile devices identified by the at least two mobile device identifiers detected within the repeating mobile device proximity pairing pattern across the several different purchases.

9. The system of claim 8, where the processor is further programmed to:
 capture purchase histories in accordance with the purchases; and correlate the captured purchase histories with the paired mobile devices.

10. The system of claim 8, where the processor is further programmed to:
   detect, in real time within a retail environment, a presence of each of the paired mobile devices; and
   utilize information derived from the detected repeating mobile device proximity pairing pattern and the several different purchases that correspond to the repeating mobile device proximity pairing pattern to target content delivery to one of the paired mobile devices, where content delivery bandwidth is reduced by sending any particular targeted content to the one of the paired mobile devices, the processor being programmed to:
      identify, using transaction histories of the paired mobile devices, one of a primary product category and an accessory product category routinely purchased by a user of a different one of the paired mobile devices during paired shopping experiences of users of the paired mobile devices; and
      identify the target content to deliver to the one of the paired mobile devices as a promotion of one of a product in one of the primary product category and the accessory product category routinely purchased by the user of the different one of the paired mobile devices during the paired shopping experiences.

11. The system of claim 8, where the processor is further programmed to:
   infer a relationship between users of the paired mobile devices based upon information derived from the detected repeating mobile device proximity pairing pattern across the several different purchases.

12. The system of claim 8, where the processor is further programmed to:
   determine a purchasing influence of at least one user of one of the paired mobile devices on a user of another one of the paired mobile devices utilizing purchase histories associated with each of the paired mobile devices that identify differences between product categories purchased by the users of the paired mobile devices while shopping together relative to the product categories purchased by the users of the paired mobile devices while shopping separately.

13. The system of claim 8, where the processor is further programmed to:
   detect, in real time within a retail environment of the at least one retail environment, a presence of each of the paired mobile devices;
   determine, using the locationing technology, that the mobile devices have separated within the retail environment; and
   send a promotion to one of the paired mobile devices for an item located in a location of the retail environment where another of the paired mobile devices is located, where processing load of the processor is reduced by sending the promotion to the one of the paired mobile devices.

14. A computer program product, comprising:
   a computer readable storage medium having computer readable program code embodied therewith, where the computer readable storage medium is not a transitory signal per se and where the computer readable program code when executed on a computer causes the computer to:
      establish, utilizing locationing technology, at least one configured mobile device monitoring radius relative to respective purchase locations within at least one retail environment;
      monitor, over time utilizing the locationing technology, mobile device distances from the purchase locations at times of purchases within the at least one retail environment;
      capture mobile device identifiers of mobile devices located within the configured mobile device monitoring radius of the respective purchase locations within the at least one retail environment at the times of the purchases;
      detect, across several different purchases, a repeating mobile device proximity pairing pattern of at least two mobile device identifiers being repeatedly located together within the configured mobile device monitoring radius of the respective purchase locations associated with the different purchases at the times of the respective different purchases; and
      pair mobile devices identified by the at least two mobile device identifiers detected within the repeating mobile device proximity pairing pattern across the several different purchases.

15. The computer program product of claim 14, where the computer readable program code when executed on the computer further causes the computer to:
   capture purchase histories in accordance with the purchases; and
   correlate the captured purchase histories with the paired mobile devices.

16. The computer program product of claim 14, where the computer readable program code when executed on the computer further causes the computer to:
   detect, in real time within a retail environment, a presence of each of the paired mobile devices; and
   utilize information derived from the detected repeating mobile device proximity pairing pattern and the several different purchases that correspond to the repeating mobile device proximity pairing pattern to target content delivery to one of the paired mobile devices, where content delivery bandwidth is reduced by sending any particular targeted content to the one of the paired mobile devices.

17. The computer program product of claim 16, where, in causing the computer to utilize the information derived from the detected repeating mobile device proximity pairing pattern and the several different purchases that correspond to the repeat mobile device proximity pairing pattern to target the content delivery to the one of the paired mobile devices, the computer readable program code when executed on the computer causes the computer to:
   identify, using transaction histories of the paired mobile devices, one of a primary product category and an accessory product category routinely purchased by a user of a different one of the paired mobile devices during paired shopping experiences of users of the paired mobile devices; and
   identify the target content to deliver to the one of the paired mobile devices as a promotion of one of a product in one of the primary product category and the accessory product category routinely purchased by the user of the different one of the paired mobile devices during the paired shopping experiences.

18. The computer program product of claim 14, where the computer readable program code when executed on the computer further causes the computer to:

infer a relationship between users of the paired mobile devices based upon information derived from the detected repeating mobile device proximity pairing pattern across the several different purchases.

19. The computer program product of claim 14, where the computer readable program code when executed on the computer further causes the computer to:
   determine a purchasing influence of at least one user of one of the paired mobile devices on a user of another one of the paired mobile devices utilizing purchase histories associated with each of the paired mobile devices that identify differences between product categories purchased by the users of the paired mobile devices while shopping together relative to the product categories purchased by the users of the paired mobile devices while shopping separately.

20. The computer program product of claim 14, where the computer readable program code when executed on the computer further causes the computer to:
   detect, in real time within a retail environment of the at least one retail environment, a presence of each of the paired mobile devices;
   determine, using the locationing technology, that the mobile devices have separated within the retail environment; and
   send a promotion to one of the paired mobile devices for an item located in a location of the retail environment where another of the paired mobile devices is located, where processing load of the computer is reduced by sending the promotion to the one of the paired mobile devices.

* * * * *